(12) United States Patent
Nadir et al.

(10) Patent No.: US 12,230,053 B2
(45) Date of Patent: Feb. 18, 2025

(54) AUTOMATIC FACE AND HUMAN SUBJECT ENHANCEMENT ALGORITHM FOR DIGITAL IMAGES

(71) Applicant: Samsung Electronics Co., Ltd., Suwon-si (KR)

(72) Inventors: Zeeshan Nadir, Richardson, TX (US); John W. Glotzbach, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 488 days.

(21) Appl. No.: 17/591,530

(22) Filed: Feb. 2, 2022

(65) Prior Publication Data

US 2023/0245494 A1    Aug. 3, 2023

(51) Int. Cl.
*G06T 7/00* (2017.01)
*G06T 5/94* (2024.01)
*G06T 7/10* (2017.01)
*G06V 40/16* (2022.01)

(52) U.S. Cl.
CPC .............. *G06V 40/161* (2022.01); *G06T 5/94* (2024.01); *G06T 7/10* (2017.01); *G06T 2207/20081* (2013.01); *G06T 2207/20084* (2013.01); *G06T 2207/30201* (2013.01)

(58) Field of Classification Search
CPC .............. G06T 7/90; G06T 2207/20008; G06T 2207/10024; G06T 2207/20076; G06T 2207/20081; G06T 2207/20084; G06T 2207/30088; G06T 2207/30168; G06T 7/0012; G06T 2207/30201; G06T 5/50; G06T 5/94; G06T 7/97; G06T 5/90; G06T 5/40; G06T 5/75; G06T 2219/2016; G06T 1/00; G06T 7/0014; G06T 2207/30216; G06T 5/00; G06T 7/00; G06T 7/40; G06T 11/00; G06T 13/00; G06T 13/40; G06T 13/80; G06T 19/00; G06T 19/006; G06T 19/20; G06T 2219/2004; G06T 7/11; G06V 10/764; G06V 10/56; G06V 2201/03; G06V 40/172; G06V 10/72; G06V 40/01

See application file for complete search history.

(56) References Cited

U.S. PATENT DOCUMENTS

| | | |
|---|---|---|
| 8,233,789 B2 | 7/2012 | Brunner |
| 10,372,971 B2 | 8/2019 | Rivard et al. |
| 10,936,853 B1 | 3/2021 | Sethi et al. |
| 2006/0215924 A1* | 9/2006 | Steinberg ............. H04N 5/2628 348/222.1 |
| 2007/0110305 A1* | 5/2007 | Corcoran ............... G06V 40/16 382/167 |
| 2013/0258118 A1* | 10/2013 | Felt ........................ H04N 9/643 348/207.1 |
| 2014/0079319 A1 | 3/2014 | Lin et al. |
| 2017/0132771 A1 | 5/2017 | Agaian et al. |

(Continued)

*Primary Examiner* — Quan M Hua

(57) ABSTRACT

An apparatus includes a memory configured to store images and a processor. The processor is configured to receive an input image. The processor is further configured to partition a human mask in the input image using a segmentation algorithm. The processor is also configured to generate a skin map based on identifying skin in the input image using the human mask. In addition, the processor is configured to process an output image with brightening applied using the skin map.

20 Claims, 14 Drawing Sheets

(56) References Cited

U.S. PATENT DOCUMENTS

| | | | |
|---|---|---|---|
| 2018/0352150 A1* | 12/2018 | Purwar | G06T 7/536 |
| 2019/0108388 A1* | 4/2019 | Rivard | G06V 10/758 |
| 2019/0251674 A1* | 8/2019 | Chang | G06N 3/045 |
| 2021/0125311 A1 | 4/2021 | Zhang | |

* cited by examiner

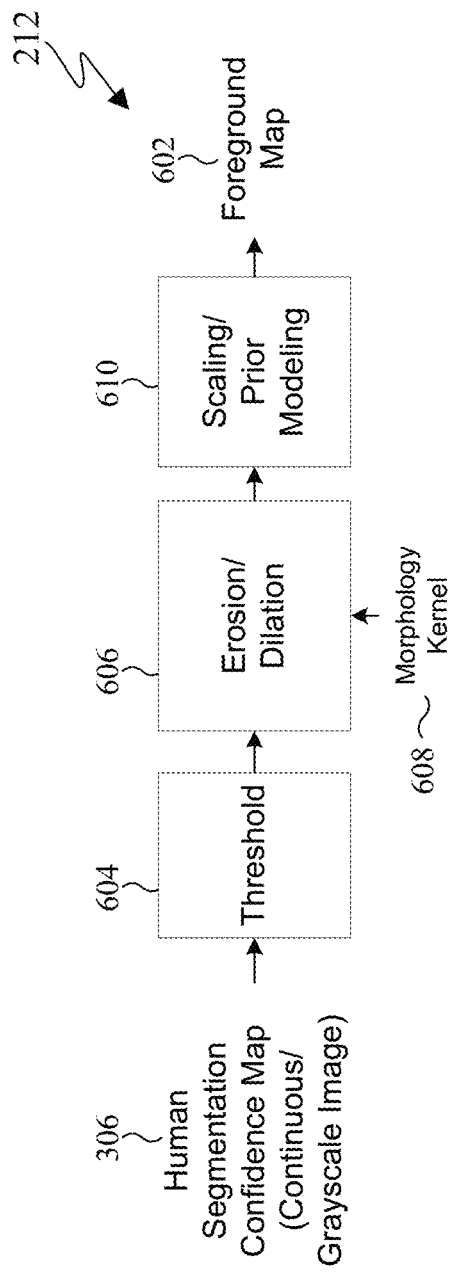
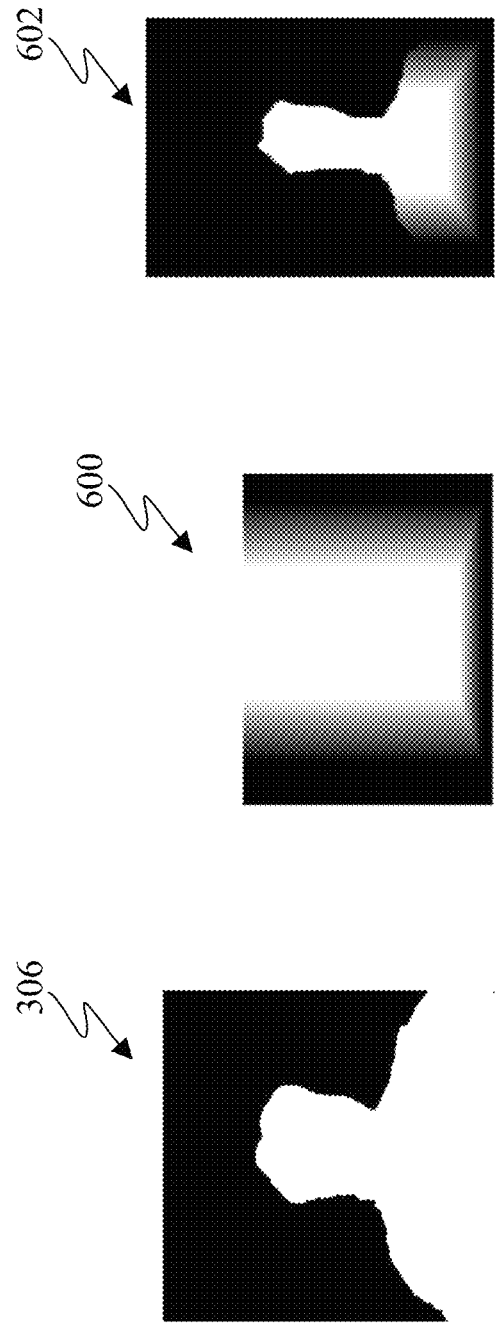
FIG. 6A
FIG. 6B
FIG. 6C
FIG. 6D

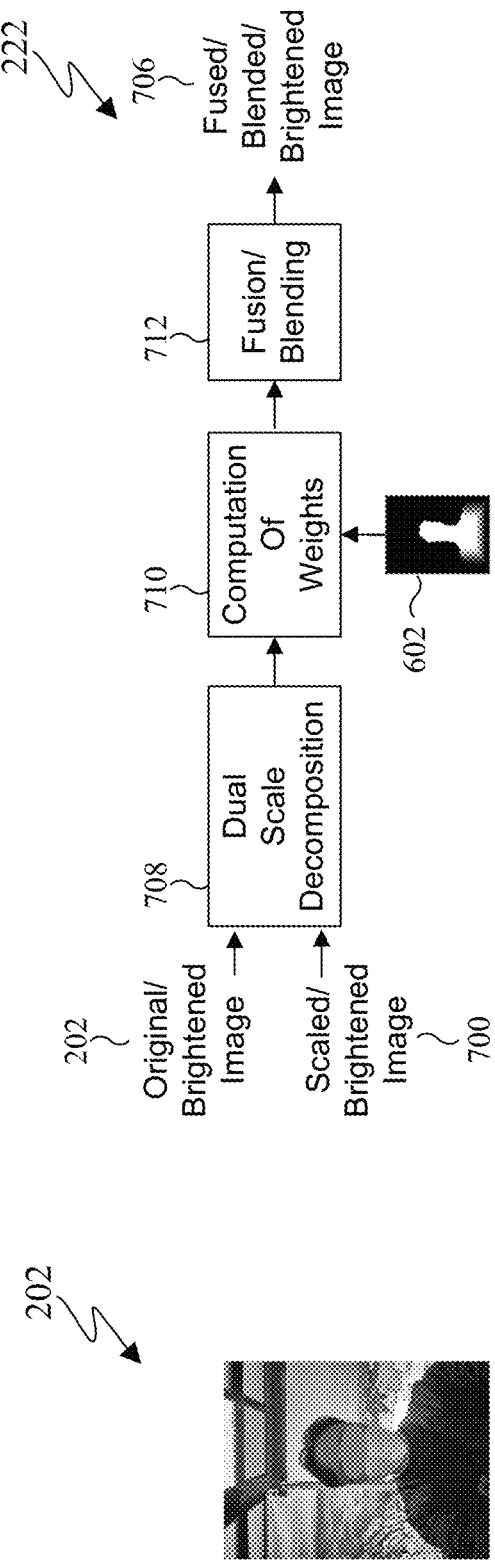
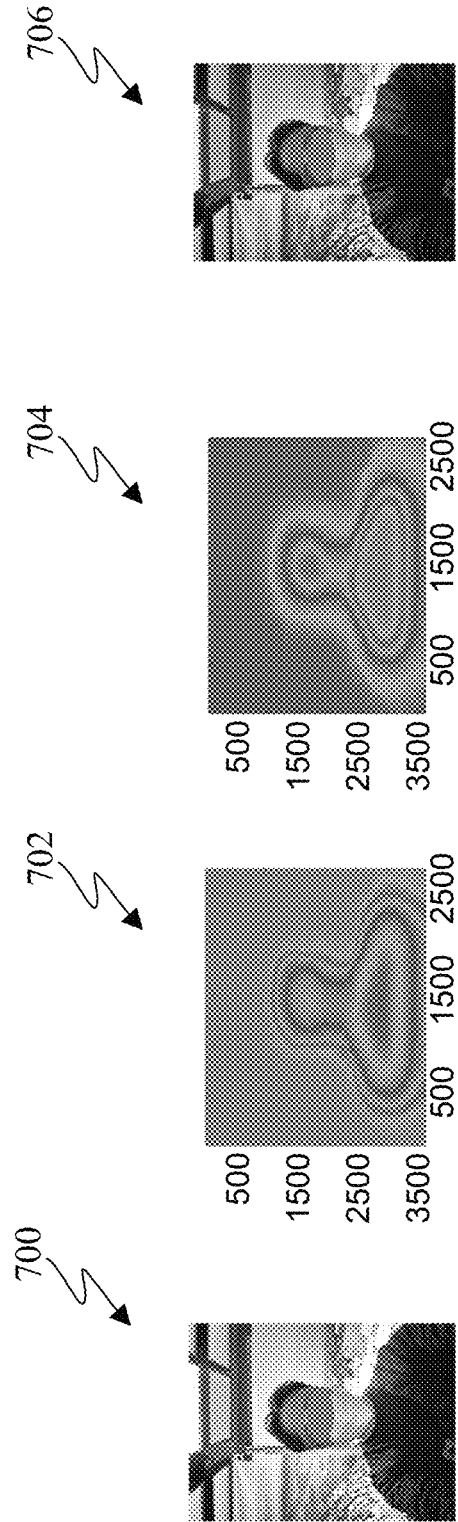
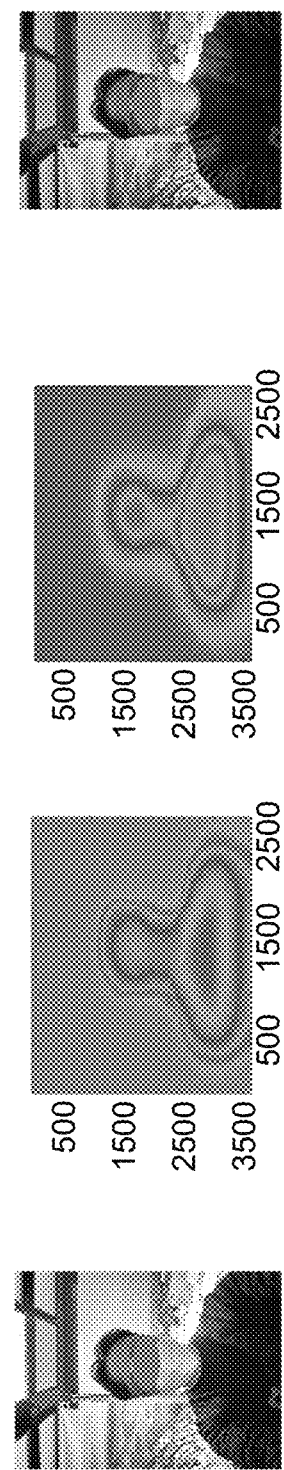
FIG. 7A
FIG. 7B
FIG. 7C
FIG. 7D
FIG. 7E
FIG. 7F

AUTOMATIC FACE AND HUMAN SUBJECT ENHANCEMENT ALGORITHM FOR DIGITAL IMAGES

TECHNICAL FIELD

This disclosure relates generally to image processing devices and processes. More specifically, this disclosure relates to an automatic face and human subject enhancement algorithm for digital images.

BACKGROUND

Studies have shown that brighter faces in images are more aesthetically pleasing to users. Often in low light images, the exposure time causes faces to have less brightness than is desirable. Current image processing pipelines do not typically adjust face brightness at levels suitable for pleasing a user.

SUMMARY

This disclosure provides an automatic face and human subject enhancement algorithm for digital images.

In a first embodiment, an apparatus includes a memory configured to store images and a processor. The processor is configured to receive an input image and partition a human mask in the input image using a segmentation algorithm. The processor is further configured to generate a skin map based on identifying skin in the input image using the human mask. The processor is also configured to process an output image with brightening applied using the skin map.

In a second embodiment, a method includes receiving an input image, and partitioning a human mask in the input image using a segmentation algorithm. The method further includes generating a skin map based on identifying skin in the input image using the human mask. The method also includes processing an output image with brightening applied using the skin map.

In a third embodiment, a non-transitory machine readable medium stores instructions that when executed cause a processor to receive an input image and partition a human mask in the input image using a segmentation algorithm. The instructions that when executed further cause a processor to generate a skin map based on identifying skin in the input image using the human mask. The instructions that when executed also cause a processor to process an output image with brightening applied using the skin map.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A through 6D illustrate foreground map generation in accordance with this disclosure;

FIGS. 7A through 7F illustrate an exemplary guided fusion in accordance with this disclosure;

DETAILED DESCRIPTION

FIGS. 1 through 13, described below, and the various embodiments of this disclosure are described with reference to the accompanying drawings. However, it should be appreciated that this disclosure is not limited to these embodiments and all changes and/or equivalents or replacements thereto also belong to the scope of this disclosure.

When capturing images with human subjects, people viewing the images pay significant attention to the appearance of faces in the images. The perception for a quality of the images is impacted by a brightness of the faces. Users desire to have a brighter face with a suitable contrast in low light situations. Typically, processing images capture in low light does not efficiently capture details of faces sufficiently. When brightening a face during image processing, an unacceptable amount of contrast is lost making the face look very noising and not sharp.

Figure 1:
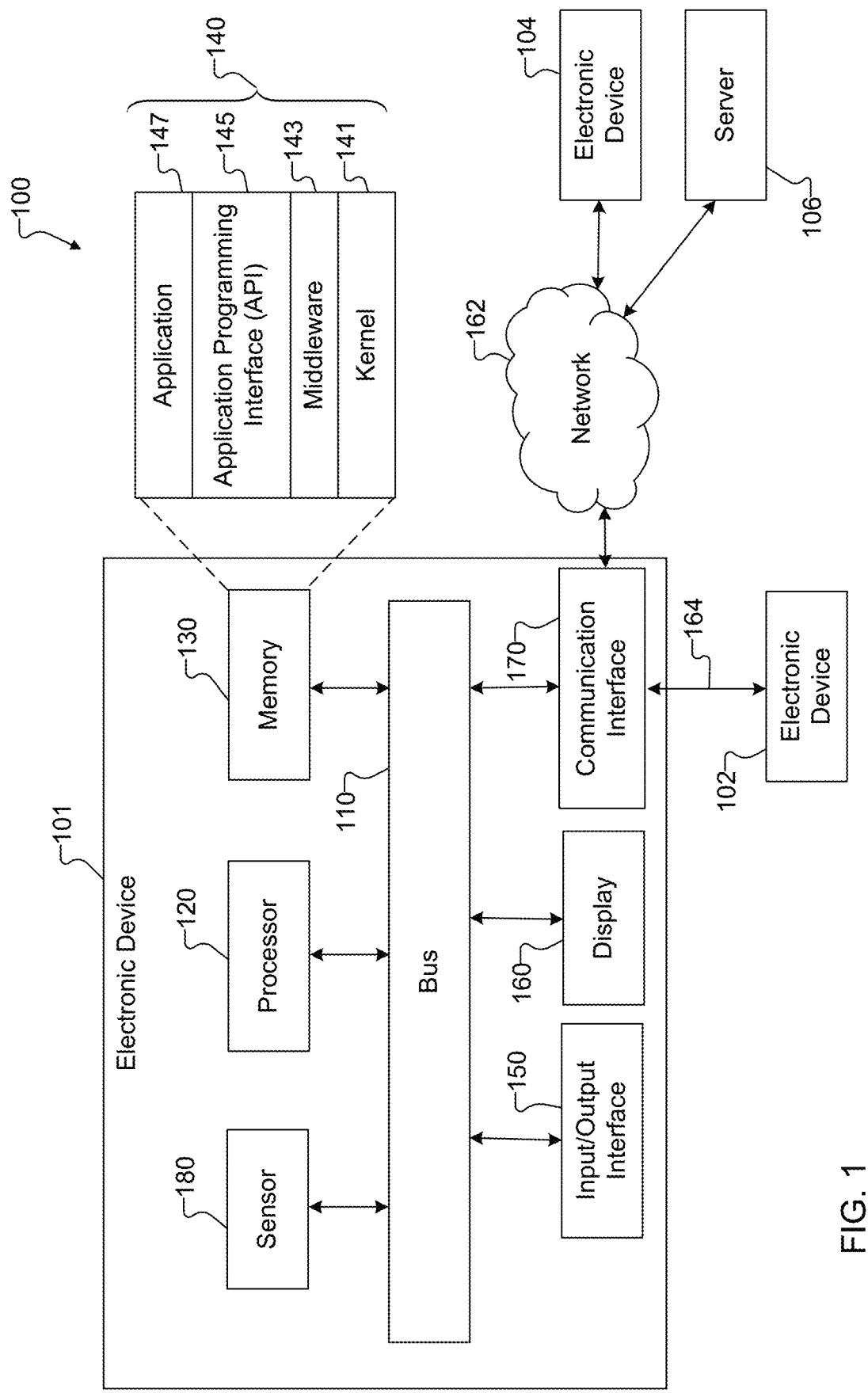
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 may obtain and process input images to brighten skin, especially in the face, as described in more detail below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain and process input images to brighten skin, especially in the face, as described in more detail below. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. Automatic and Automatically refer to functions occurring without human intervention or without intervening human action required. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments of this disclosure, the server 106 may obtain and process input images to brighten skin, especially in the face, as described in more detail below.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
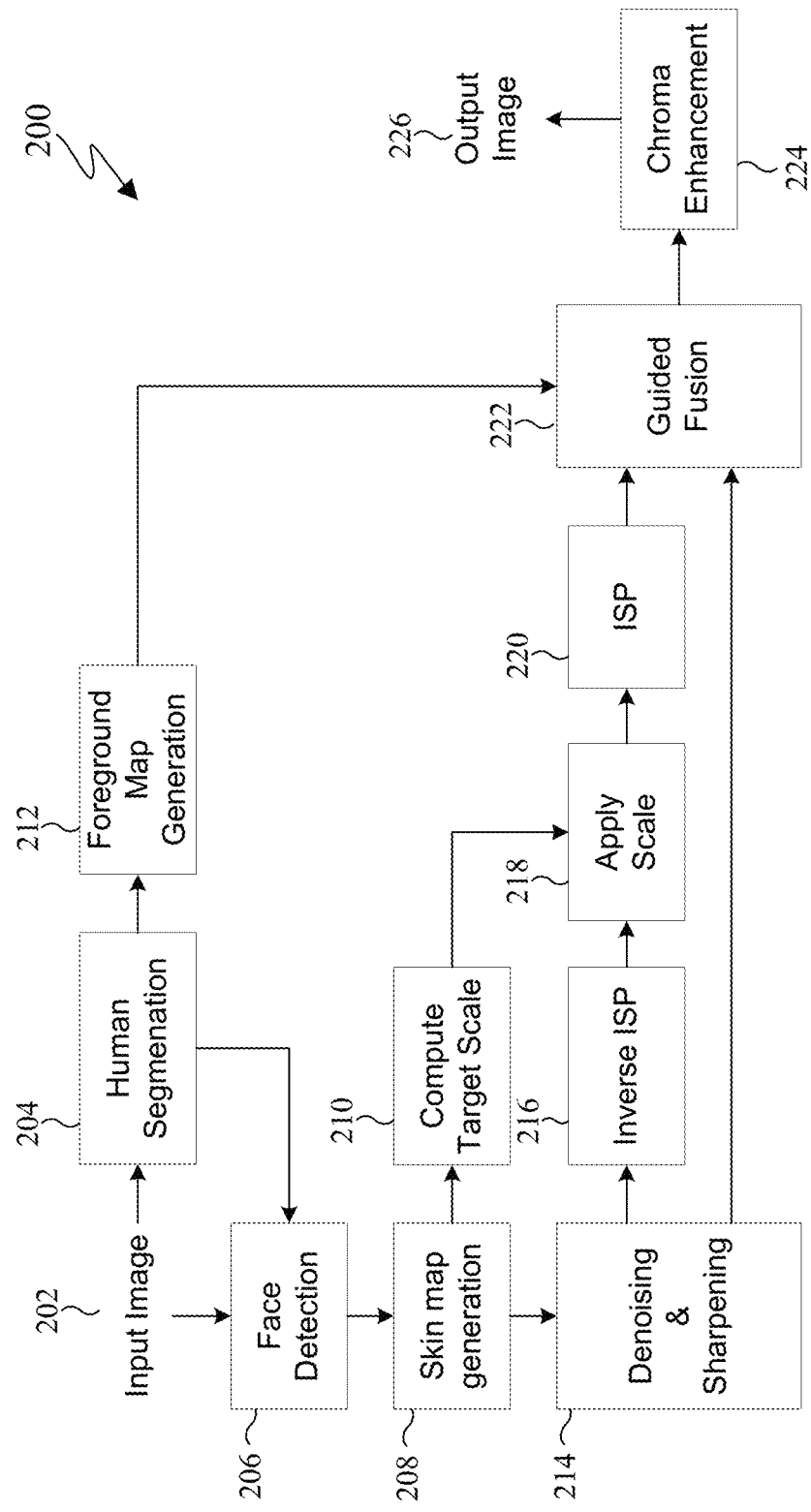
FIG. 2 illustrates an exemplary automatic face and human subject enhancement algorithm for digital images in accordance with this disclosure.

FIG. 2 illustrates an exemplary automatic face and human subject enhancement process 200 for a digital input image 202 in accordance with this disclosure. The embodiment of the automatic face and human subject enhancement process 200 illustrated in FIG. 2 is for illustration only. FIG. 2 does not limit the scope of this disclosure to any particular implementation of an electronic device.

As shown in FIG. 2, the electronic device 101 receives an input image 202. The input image 202 can be output by an image signal processor (ISP) of a camera or in general any red, green, blue (RGB) image. The ISP could be either in the form of a specialized hardware or software implementation. The input image 202 can be received from the sensor 180 (e.g., camera) of the electronic device 101, read from the memory 130 of the electronic device 101, received through the communication interface 170 of the electronic device 101 from the first external electronic device 104 or the server 106 over the first network 162, or received through the communication interface 170 of the electronic device 101 from a second external electronic device 102 over the second network 164. The input image 202 can be an image that has been normally processed.

The electronic device 101 can perform human segmentation 204 on the input image 202 to generate a human mask. Human(s) can be segmented in the input image 202 from the background or other objects. A partition is provided between the segmented human and other objects in the human mask. The human mask is output from the human segmentation 204. The human segmentation 204 is described in greater detail below in regard to FIG. 3.

Once the humans are segmented from the background, the electronic device 101 can perform face detection 206 on the input image 202. Typically, a face detection algorithm is run on the input image. The face detection 206 outputs a box indicating a face portion from a body portion in the input image 202 and further reduce the uncertainty in facial pixels. The box indicating the facial region can be used in conjunction with a human mask to narrow down the facial skin area. In certain embodiments, the face detection 206 can remove portions of the human mask that do not correspond to the face. The face detection 206 is described in greater detail below with respect to FIG. 4.

The electronic device 101 can perform a skin map generation 208 on the face mask. The skin map generation 208 can identify a collection of pixels that comprises a skin area of the face portion. A reason for identifying a skin area is for determining an amount to brighten the face region due to different skin tones. A light skin tone reflects a greater amount of light than a darker skin tone, and therefore would require less brightening. Alternatively, a darker skin reflects less light, which is considered in brightening the facial region of input image 202. The skin map generation 208 produces a skin map or skin area, which is the pixels corresponding to the skin region of the face. For example, the skin area for the face can include the neck area, the ears, the forehead, the region surrounding the eyes, and the like.

In certain embodiments, the skin map generation 208 can identify the collection of pixels from the input image 202. The skin map generation 208 could be limited to identifying pixels that are within the partition of the either the human mask or the face mask. In other words, skin pixels can be allowed to include skin areas other than face, such as arms and hands. Pixels that are identified as non-skin can be removed from the human mask or the face mask leaving the pixels that are identified as skin as the skin map. The skin map generation 208 is described in greater detail below with respect to FIGS. 5A and 5B.

The electronic device 101 can perform target scale computation 210 of the skin map of the input image 202. The target scale is an amount to brighten the extracted skin area. A target luminance level is an ideal bright level for skin in the input image 202 and is determined based on a color of the extracted skin area and the amount to brighten the skin. The target scale is a ratio of the current level of brightness and the target level of brightness, or the current luminance level and the target luminance level. For example, a target luminance could be 100 (on an arbitrary scale), which would indicate that a suitable level for the luminance is 100. A current brightness of the input image 202 could be 50, which would make the target scale 2. The skin portions of the input image 202 could be scaled by a factor of 2. The target scale can by defined by Equation 1:

$$\text{Scale} = \min\left\{\frac{\text{target } luma}{\text{mean}(X\_luma(skinMap))}, 3\right\}, \tag{1}$$

where X_luma is the luminance channel of the input image and skinMap represents indices representing skin regions and target. The following represents an algorithm for restricting the target scale for all of the skin pixels.

---

$X_s \leftarrow X(S)$
$L_{avg} \leftarrow$ Luma Average $(X_s)$ $\text{Scale} \leftarrow \dfrac{T}{L_{avg}}$ If Scale > 3:
  Scale ← 3
End If

--- where T represents a target luma, S represents a skin map, and X represents an input image 202. The pixels can be restricted to a maximum scale of 3 as a safety factor to reduce artifacts, specifically noise artifacts.

The electronic device 101 can perform foreground map generation 212 to determine which regions of the input image are to be brightened and which regions are not to be brightened. In other words, the foreground map generation can determine that the portions of the image containing human(s) are to be used from a brightened version of the input image and the remaining portions of the image are to be used from the un-brightened version of the input image 202 (or non-brightened image). The input image 202 and the human mask can be used in the foreground map generation to determine a foreground map. The foreground map can also be multiplied by a gain factor. The foreground map generation 212 is described in greater detail below with respect to FIGS. 6A-6D.

The electronic device 101 can perform denoising and sharpening 214 on input image 202. In certain embodiments, the entire image is denoised and sharpened. The denoising and sharpening 214 can denoise and sharpen the collections of pixels representative of the skin portion of the face to output a denoised and sharpened skin portion of the face. A conventional algorithm can be used for denoising, such as BM3D, KSVD, dictionary based denoising, Wavelet, Fourier, or any other suitable algorithm for denoising. The main purposes of denoising and sharpening are (1) limiting noise on a facial area that may result due to scaling or brightening; and (2) enhancing features of the face for a sharper look.

The electronic device 101 can perform an inverse ISP 216 on the input image 202. Because the input image 202 has already been processed by an ISP, the light levels are not represented in a linear scale. Using the inverse ISP 216, the input image 202 can be processed to a linear scale. The inverse ISP 216 can linearize the input image 202 from a gamma corrected space to a linear space, for example, by using Equation 2:

$$X_L = X_{NL}{}^{2.2} \tag{2}$$

The electronic device 101 can apply scaling application 218 to a skin portion of a face of the human using the linearized image and the target scale. Once the input image 202 has been inversely processed back to a linear scale, the target scale can be used appropriately to adjust the pixels representing the skin of the face. The electronic device 101 can perform ISP 220 on the scaled image. For example, if in inverse ISP 216, we used equation (2) to linearize the image, we can take it back to a human perceptual space by undoing the operation in equation (3) as given below:

$$X_{NL} + X_L^{\frac{1}{2.2}} \tag{3}$$

The electronic device 101 can perform fusion of the brightened image and the input image 202. The electronic device 101 can fuse the skin regions from the brightened image and the non-skin regions from the non-brightened or input image 202. The result is a processed image with skin brightened.

The electronic device 101 can perform chroma enhancement 224 on the skin brightened image. The skin brightened image can have a contrast increased or enhancement, such as changing colors. The result of the chroma enhancement 224 is an output image 226. The output image can be output to a display 160 of the electronic device 101, stored into the memory 130 of the electronic device 101, transmitted through the communication interface 170 of the electronic device 101 to the first external electronic device 104 or the server 106 over the first network 162, transmitted through the communication interface 170 of the electronic device 101 to a second external electronic device 104 over the second network 164.

Although FIG. 2 illustrates one example of a process 200 for automatic face and human subject enhancement algorithm for digital images, various changes may be made to FIG. 2. For example, while shown as a series of steps, various steps in FIG. 2 may overlap, occur in parallel, or occur any number of times.

Figure 3:
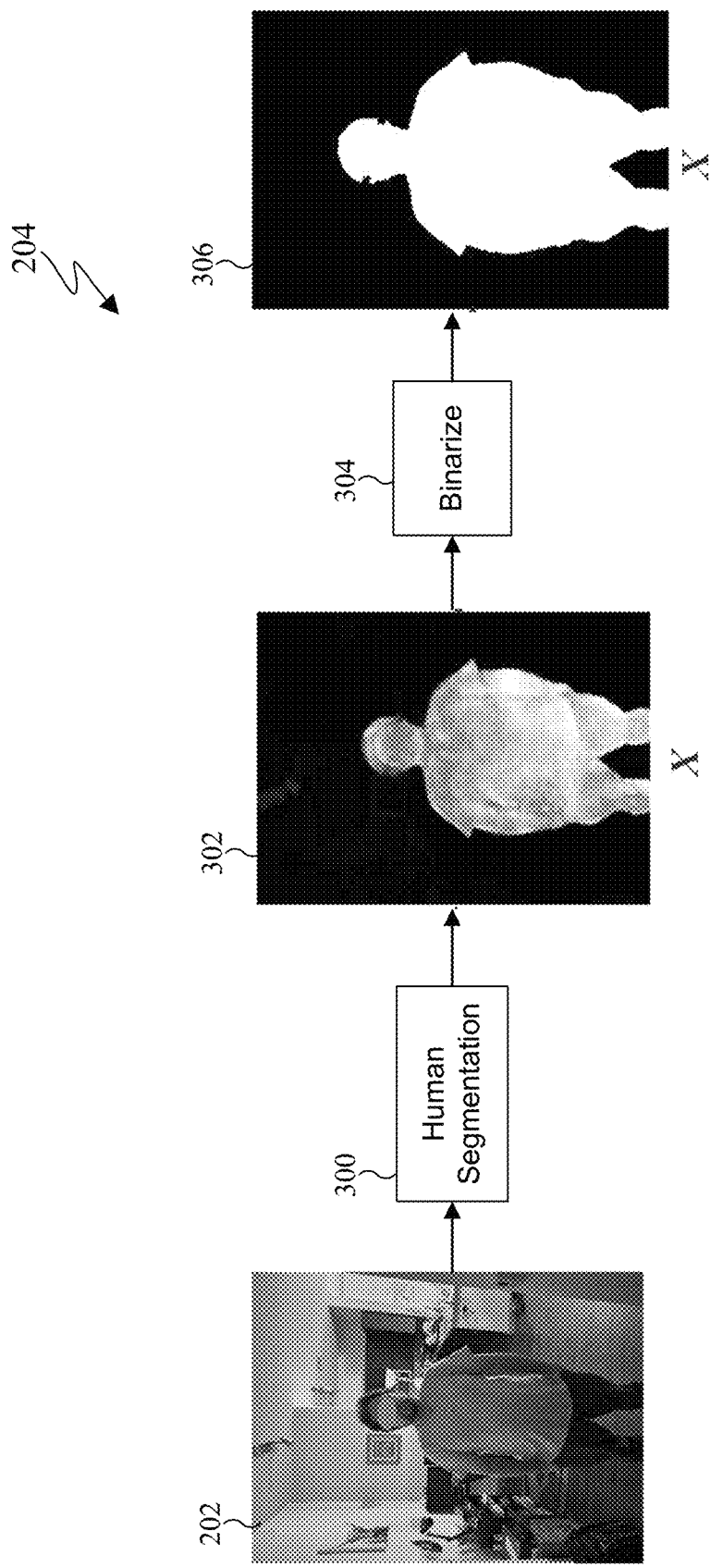
FIG. 3 illustrates exemplary human segmentation in accordance with this disclosure.

FIG. 3 illustrates exemplary human segmentation 204 in accordance with this disclosure. The embodiment of the human segmentation 204 illustrated in FIG. 3 is for illustration only. FIG. 3 does not limit the scope of this disclosure to any particular implementation of a human segmentation.

As shown in FIG. 3, human segmentation 204 is performed on an input image 202. Human segmentation 204 can be implemented using AI or non-AI segmentation tools.

The electronic device 101 can perform human segmentation 204 on the input image 202 to distinguish human features from other features, such as background features. The human segmentation 204 can generate a soft classification of the input pixels as shown by the grayscale human segmentation 300. The grayscale human segmentation 300 determines a likelihood of a pixel in the input image 202 corresponding to a human. The pixels are given a shade of gray corresponding to a likelihood of being a human in a grayscale human mask 302. The grayscale human mask 302 has portions that are not fully determinative of a human or background. However, a pixel in the grayscale mask 302 has an increasing probability of being skin the closer that the respective pixel is to white. The human segmentation 300 can be performed by any conventional segmentation algorithm.

The electronic device 101 can perform a binarize function 304 on the grayscale human mask 302 to create a human mask 306. The binarize function 304 takes the grayscale human mask 302 and reduces the grayscale pixels to either white or black to generate the human mask 306. The determination between white and black for each respective pixel can be made based on a value of the gray for each pixel compared to a threshold. The mathematical details for the human mask 306 can be expressed as:

$$\begin{aligned}&B \leftarrow \text{Zeros} \\ &X \leftarrow \text{Human Segmentation Mask} \\ &\text{For each pixel } x_i: \\ &\quad \text{If } x_i > \text{Threshold} \\ &\quad\quad b_i \leftarrow 1 \\ &\quad \text{End If} \\ &\text{End For}\end{aligned}$$

Although FIG. 3 illustrate a human segmentation, various changes may be made to FIG. 3. For example, the sizes, shapes, and dimensions of the human segmentation 204 and its individual components can vary as needed or desired. Also, the number and placement of various components of the human segmentation 204 can vary as needed or desired. In addition, the human segmentation 204 may be used in any other suitable imaging process and is not limited to the specific processes described above.

Figure 4:
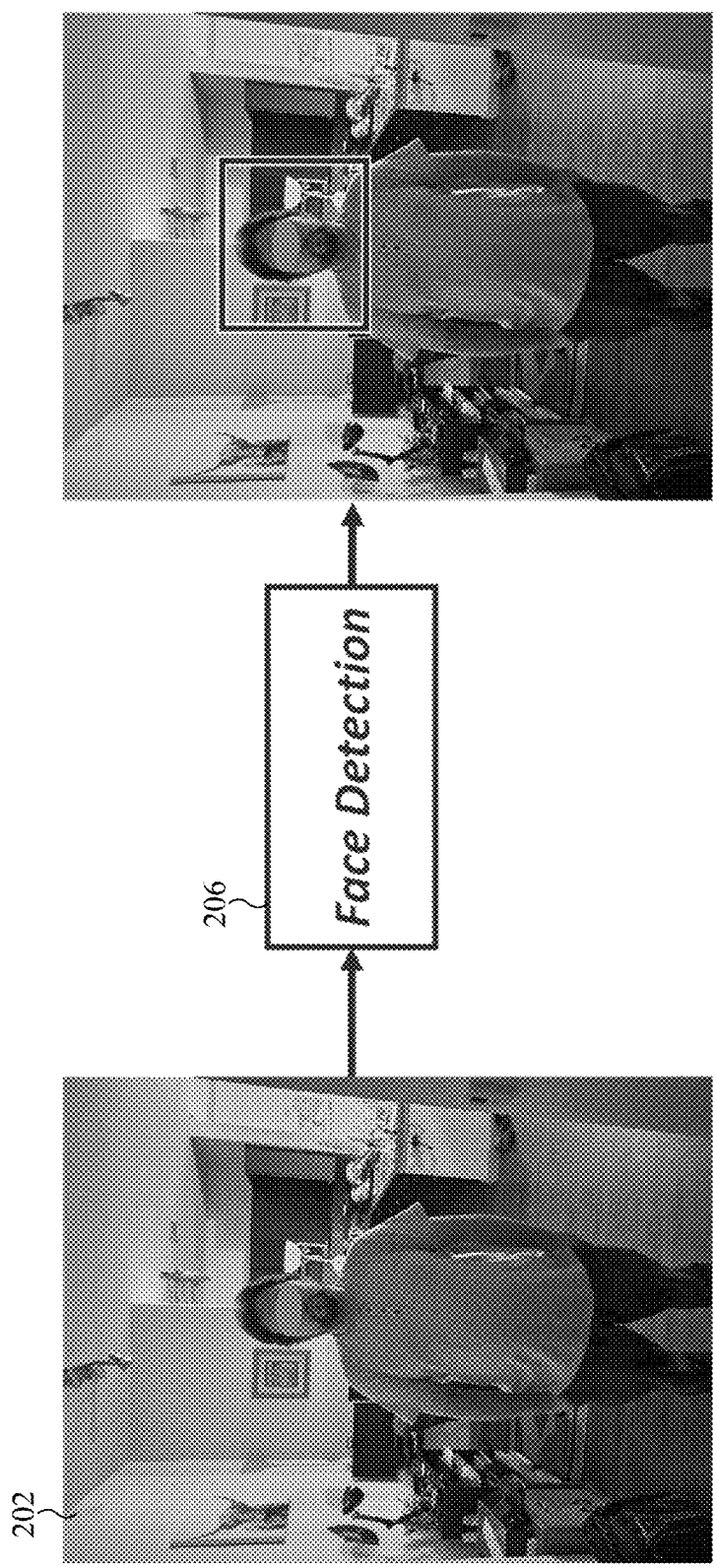
FIG. 4 illustrates an exemplary face detection in accordance with this disclosure.

FIG. 4 illustrates an exemplary face detection 206 in accordance with this disclosure. The embodiment of the face detection 206 illustrated in FIG. 4 is for illustration only. FIG. 4 does not limit the scope of this disclosure to any particular implementation of face detection.

As shown in FIG. 4, face detection 206 can be performed on the input image 202. The purpose of the face detection 206 is to limit the later processes to the facial region. The face detection can be performed using any standard facial recognition method. In certain embodiments, the face detection can use the human mask 306 in conjunction with the input image 202 as a starting point or as a reference to reduce an amount of the input image 202 that need to be analyzed. In certain embodiments, the results of the face detection can be compared to the human mask 306. The human mask 306 can be reduced to the detected face or a separate face mask can be generated.

Although FIG. 4 illustrates a face detection 206, various changes may be made to FIG. 4. For example, the sizes, shapes, and dimensions of the face detection 206 and its individual components can vary as needed or desired. Also, the number and placement of various components of the face detection 206 can vary as needed or desired. In addition, the face detection 206 may be used in any other suitable imaging process and is not limited to the specific processes described above.

Figure 5A:
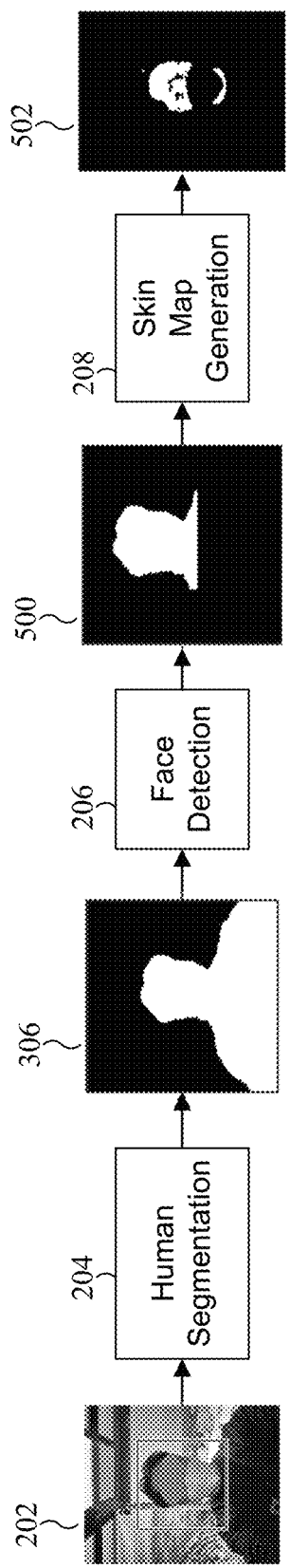
FIGS. 5A and 5B illustrate skin map generation in accordance with this disclosure.
Figure 5B:
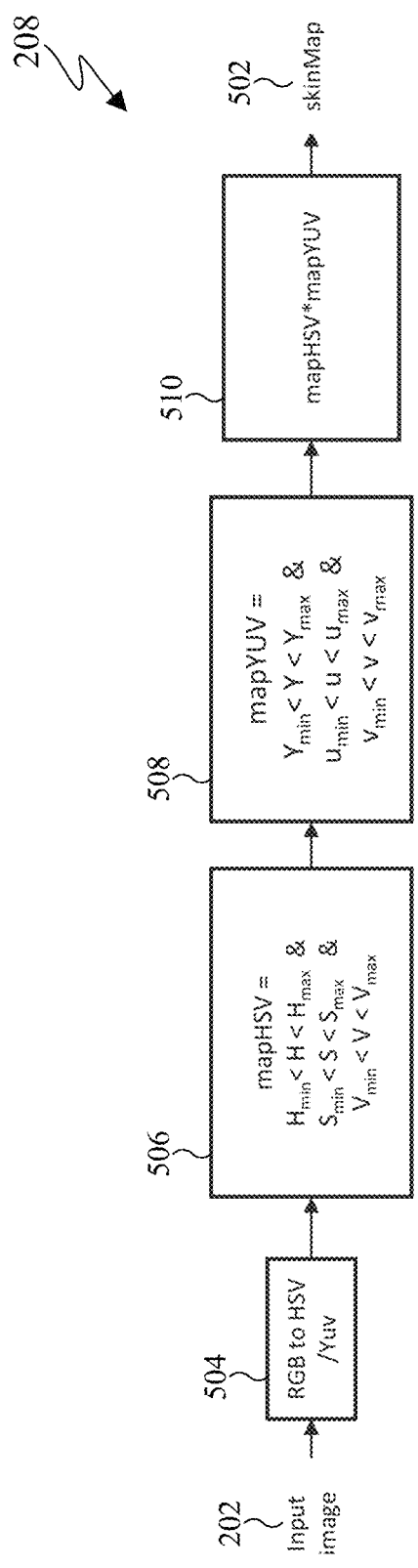

FIGS. 5A and 5B illustrate skin map generation 208 in accordance with this disclosure. In particular, FIG. 5A illustrates skin map generation 208, and FIG. 5B illustrates process 200 through skin map generation 208. The embodiments of the skin map generation 208 shown in FIGS. 5A and 5B are for illustration only. FIGS. 5A and 5B do not limit the scope of this disclosure to any particular implementation of skin map generation.

As shown in FIG. 5A, a human mask 306 is generated from human segmentation 204 on the input image 202. A face mask 500 is generated from face detection 206 on the human mask 306 or a combination of the input image 202 and the human mask 306.

As shown in FIG. 5B, the skin map generation 208 generates a skin map 502 from an input image 202. Typically, images stored on an electronic device 101 are displayed in red, green, and blue. The other colors displayed are synthesized by combining appropriate amounts of red, green, and blue. The skin map generation 208 separates the brightness from the color of the image. The color information (RGB) is retained.

As a non-limiting example, a light can be adjusted in a room. Although the light can change in the room, the colors of objects in the room do not change. The light part needs to be separated from the color information. The color transform 504 changes the color (RGB) to useable parameters, including hues, saturation, and value of luminance (HSV) or hues, saturation, and luminance (HSL). The color transform 504 also changes the color (RGB) to a color space (YUV). The luminance and color space can be used to identify the skin portions.

An HSV map 506 is produced with pixels selected based on each HSV value within a respective range. For example, the HSV map 506 can be formed of pixels with an H value between an H minimum and an H maximum, an S value between an S minimum and an S maximum, and an V value between an V minimum and V maximum. An YUV map 508 is produced with pixels selected based on each YUV value within a respective range. For example, the YUV map 508 can be formed of pixels with an Y value between an Y minimum and an Y maximum, a U value between a U minimum and a U maximum, and an V value between an V minimum and V maximum. The skin map 502 is produced by multiplying 510 the HSV map 506 and the YUV map 508. The respective minimum and maximums can be determined based on identifying a skin tone or they can be learnt from a set of training data. The maximums and minimum help us identify a skin color from amongst all the possible colors presented.

Although FIGS. 5A and 5B illustrate a skin map generation, various changes may be made to FIGS. 5A and 5B. For example, the sizes, shapes, and dimensions of the skin map generation 208, and their individual components can vary as needed or desired. Also, the number and placement of various components of the skin map generation 208 can vary as needed or desired. In addition, the skin map generation 208 may be used in any other suitable imaging process and is not limited to the specific processes described above.

FIGS. 6A through 6D illustrate foreground map generation 212 in accordance with this disclosure. In particular, FIG. 6A illustrates foreground map generation 212, FIG. 6B illustrates a human mask 306, FIG. 6C illustrates a gain map 600, and FIG. 6D illustrates a foreground map 602. The embodiments of the foreground map generation 212, the human mask 306, the gain map 600, and the foreground map 602 illustrated in FIGS. 6A through 6D are for illustration only. FIGS. 6A through 6D do not limit the scope of this disclosure to any particular implementation of foreground map generation.

As shown in FIGS. 6A through 6D, the human mask 306 can be produced by the human segmentation 204. The electronic device 101 can apply a threshold function 604 to the human mask 306. The threshold function 604 can be the same as the binarize function 304.

The electronic device can perform erosion and dilation functions 606 on the human mask 306 using a morphology kernel 608. The morphology kernel 608 is a structuring element that can function as a template for determining a status for each of the pixels during the erosion and dilation function 606. The erosion and dilation functions 606 perform different functions at boundaries of the human mask 306. An erosion function removes pixels on object boundaries and the dilation function adds pixels on object boundaries. The erosion and dilation functions 606 can detect false positive pixels or pixels that are incorrectly determined as human pixels in the human mask 306. The false positive pixels are then switched to negative pixels. The erosions and dilations functions 606 can also detect false negative pixels or pixels that are incorrectly determined as non-human pixels in the human mask 306. The false negative pixels are then switched to positive pixels.

More often pictures taken by users are selfies or have a center focus. The human mask 306 can perform a scaling function 610 by a gain factor in gain map 600 to produce a foreground map 602 that essentially focuses on a middle of an image by reducing significance of the pixels further out from the middle of the input image 202.

Although FIGS. 6A through 6D illustrate a foreground map generation, various changes may be made to FIGS. 6A through 6D. For example, the sizes, shapes, and dimensions of the foreground map generation 212, the human mask 306, the gain map 600, and the foreground map 602 and their individual components can vary as needed or desired. Also, the number and placement of various components of the foreground map generation 212, the human mask 306, the gain map 600, and the foreground map 602 can vary as needed or desired. In addition, the foreground map generation 212, the human mask 306, the gain map 600, and the foreground map 602 may be used in any other suitable imaging process and is not limited to the specific processes described above.

FIGS. 7A through 7F illustrate an exemplary guided fusion 222 in accordance with this disclosure. In particular, FIG. 7A illustrates a guided fusion 222, FIG. 7B illustrates an input image 202, FIG. 7C illustrates a brightened image 700, FIG. 7D illustrates an input image weight 702, FIG. 7E illustrates a brightened image weight 704, and FIG. 7F illustrates a blended image 706. The embodiments of the guided fusion 222, the input image 202, the brightened image 700, the image weight 702, the brightened image weight 704, and the blended image 706 illustrated in FIGS. 7A through 7F are for illustration only. FIGS. 7A through 7F do not limit the scope of this disclosure to any particular implementation of a guided fusion 222.

As shown in FIGS. 7A through 7F, a guided fusion 222 takes the foreground from the brightened image 700 and the background from the input image 202. The input image 202 has been denoised and sharpened before brightening the input image 202. Dual scale decomposition 708 is performed on the input image 202 and the brightened image 700 to extract color detail for each pixel of the respective images. The foreground map 602 is utilize for weight computation 710 to generate an input image weight 702 for the input image 202 and a brightened image weight 704 for the brightened image 700.

As a non-limiting example, the input image weight 702 and the brightened image weight 704 each have pixels valued between 0 and 1. Corresponding pixels on the input image weight 702 and the brightened image weight 704 are equal to 1 when added together. The background areas of the input image weight 702 are assigned a higher value (closer to 1) and the foreground areas of the input image weight 702 are assigned a lower value (closer to 0). The foreground areas of the brightened image weight 704 are assigned a higher value (closer to 1) and the background areas of the brightened image weight 704 are assigned a lower value (closer to 0). The fusion algorithm 712 uses these values to determine how much detail for each pixel in the blended image 706 is taken from each pixel of the input image 202 and from each pixel in the brightened image 700.

Although FIGS. 7A through 7F illustrate a guided fusion, various changes may be made to FIGS. 7A through 7F. For example, the sizes, shapes, and dimensions of the guided fusion 222, the input image 202, the brightened image 700, the image weight 702, the brightened image weight 704, and the blended image 706 and their individual components can vary as needed or desired. Also, the number and placement of various components of the guided fusion 222, the input image 202, the brightened image 700, the image weight 702, the brightened image weight 704, and the blended image 706 can vary as needed or desired. In addition, the guided fusion 222, the input image 202, the brightened image 700, the image weight 702, the brightened image weight 704, and the blended image 706 may be used in any other suitable imaging process and is not limited to the specific processes described above.

Figure 8:
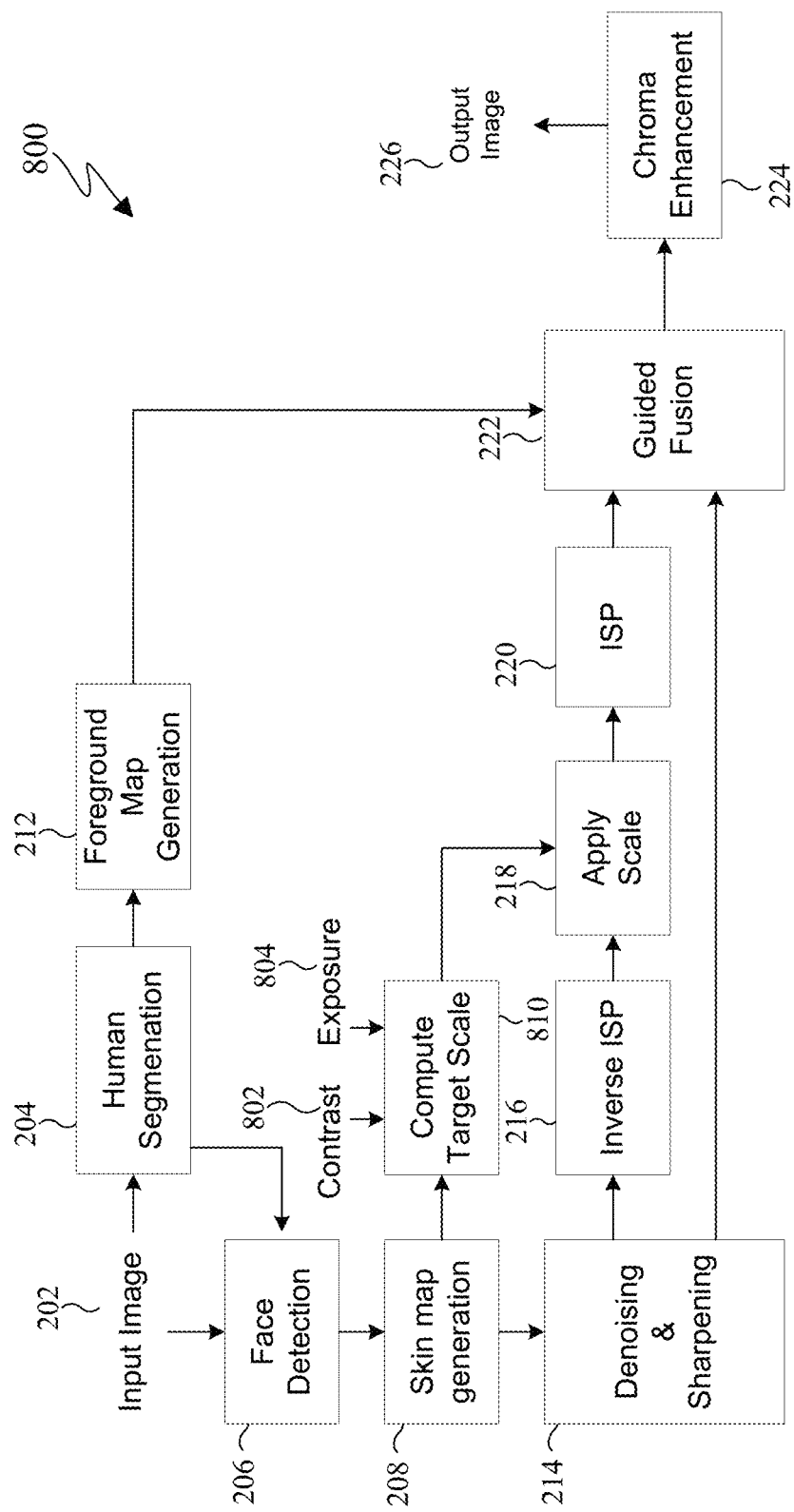
FIG. 8 illustrates an automatic face and human subject enhancement algorithm for input images in accordance with this disclosure.

FIG. 8 illustrates an automatic face and human subject enhancement process 800 for input images 202 in accordance with this disclosure. The embodiment of the automatic face and human subject enhancement process 800 illustrated in FIG. 8 is for illustration only. FIG. 8 does not limit the scope of this disclosure to any particular implementation of an automatic face and human subject enhancement algorithm. the elements 202-208 and 212-226 are the same for process 800 as elements 202-208 and 212-226 described with process 200 shown in FIG. 2. The description of elements 202-208 and 212-226 will be omitted for simplicity.

As shown in FIG. 8, a contrast information 802 and an exposure information 804 are inputs for the target scale computation 810 in addition to the input image 202 and the skin map 502. The target scale computation 810 can limit brightness of the target scale based on an exposure threshold and a contrast threshold. An example algorithm for limiting the brightness is shown as follows.

```
Algorithm 1
If Exposure < Exposure_Thresh :
    Scale ← ScaleMax_Exp
End If
If Contrast < Cont_Thresh :
    Scale ← ScaleMax_Contd
End If
```

If an overall exposure level and brightness level of the image is getting higher than desired levels, the scale can be reduced. If overall contrast of an image is more than a desired level, the scale value can be reduced. In certain embodiments, the scale can be adjusted until both an exposure and contrast are within an acceptable range. Similarly, other metrics can be used to impose constraints on the scale. An example algorithm for limiting the scale based on both of the exposure and the contrast is shown as follows.
Algorithm 2

$$\text{Scale} = \alpha \, \text{Exposure} + \beta \, \text{Contrast}$$

where the parameters $\alpha$ and $\beta$ can be learnt from data. The scale can be made into a linear function of the exposure level and contrast level of the input image. In certain embodiments, a nonlinear function can be made.

Although FIG. 8 illustrate an automatic face and human subject enhancement algorithm, various changes may be made to FIG. 8. For example, the sizes, shapes, and dimensions of the automatic face and human subject enhancement process 800 and its individual components can vary as needed or desired. Also, the number and placement of various components of the automatic face and human subject enhancement process 800 can vary as needed or desired. In addition, the automatic face and human subject enhancement process 800 may be used in any other suitable imaging process and is not limited to the specific processes described above.

Figure 9:
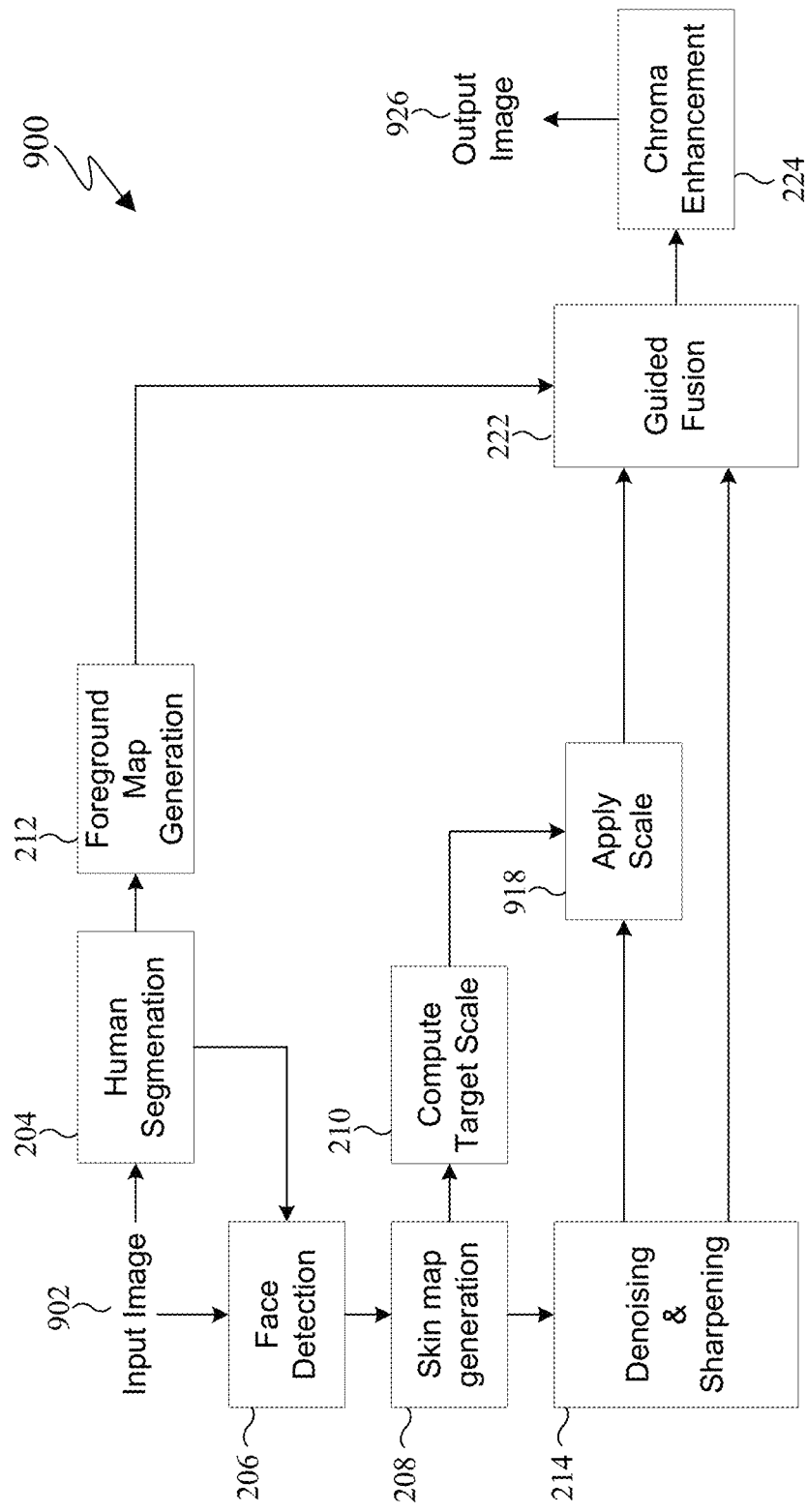
FIG. 9 illustrates an automatic face and human subject enhancement algorithm for input images in accordance with this disclosure.

FIG. 9 illustrates an automatic face and human subject enhancement process 900 for input images 202 in accordance with this disclosure. The embodiment of an automatic face and human subject enhancement process 900 illustrated in FIG. 9 is for illustration only. FIG. 9 does not limit the scope of this disclosure to any particular implementation of an automatic face and human subject enhancement algorithm. The elements 204-214, 222 and 224 are the same for human subject enhancement process 900 as elements 204-214, 222 and 224 described with process 200 shown in FIG. 2. The description of elements 204-214, 222 and 224 will be omitted for simplicity.

As shown in FIG. 9, a Bayer image 902 is used instead of an RGB input image 202. The Bayer image 902 is an image that has not been processed through an ISP pipeline. The human subject enhancement process 900 therefore does not need to perform inverse ISP 216 and ISP 220 to produce a Bayer output image 926. The scale application 918 functions similarly to scale application 218, with a difference that in this case the Bayer image 902 is scaled without the gamma operation of equation (2).

Although FIG. 9 illustrate an automatic face and human subject enhancement algorithm, various changes may be made to FIG. 9. For example, the sizes, shapes, and dimensions of the automatic face and human subject enhancement process 900 and its individual components can vary as needed or desired. Also, the number and placement of various components of the automatic face and human subject enhancement process 900 can vary as needed or desired. In addition, the automatic face and human subject enhancement process 900 may be used in any other suitable imaging process and is not limited to the specific processes described above.

Figure 10:
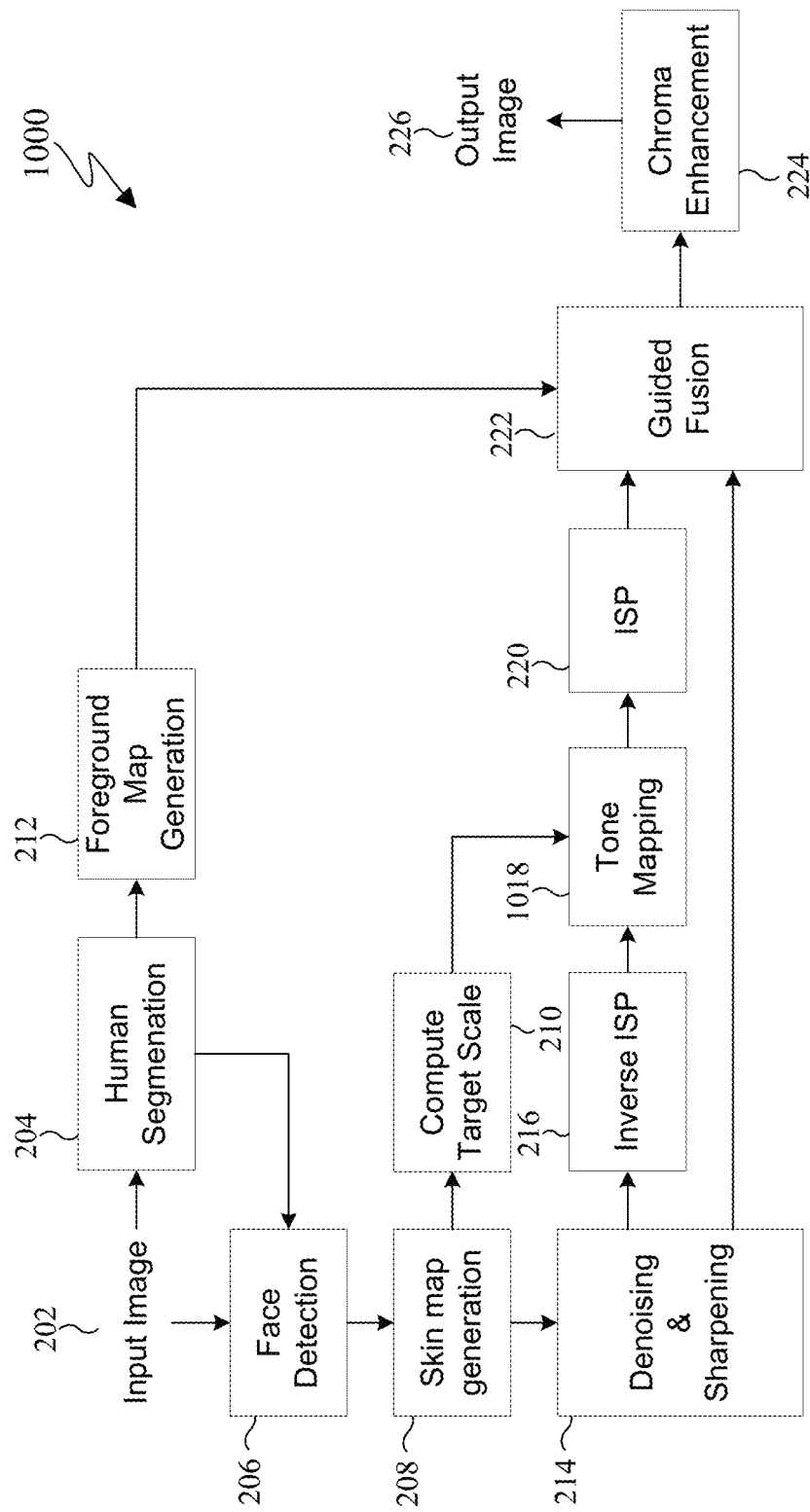
FIG. 10 illustrates an automatic face and human subject enhancement algorithm for input images in accordance with this disclosure.

FIG. 10 illustrates an automatic face and human subject enhancement process 1000 for input images 202 in accordance with this disclosure. The embodiment of the automatic face and human subject enhancement process 1000 illustrated in FIG. 10 is for illustration only. FIG. 10 does not limit the scope of this disclosure to any particular implementation of an automatic face and human subject enhancement algorithm. the elements 202-216 and 220-226 are the same for human subject enhancement process 1000 as elements 202-216 and 220-226 described with process 200 shown in FIG. 2. The description of elements 202-216 and 220-226 will be omitted for simplicity.

As shown in FIG. 10, human subject enhancement process 1000 could be used for face darkening and tone mapping. In certain scenarios, someone may be wearing too much makeup or a face that is oily, which would reflect extra light making the face look overblown and too shiny. Scenarios where too much light is reflected may have the face darkened. The algorithm for darkening would use a scale that is less than 1.

Tone-mapping 1018 could replace scale application 218 in human subject enhancement process 1000. While scale application 218 applies a single factor to each pixel, tone-mapping 1018 is more complex and provides a different factor for each individual pixel. As an example, some pixels could be brightened by a factor of 1.9 while other pixels could be brightened by a factor of 2.

Although FIG. 10 illustrate an automatic face and human subject enhancement algorithm, various changes may be made to FIG. 10. For example, the sizes, shapes, and dimensions of the automatic face and human subject enhancement process 1000 and its individual components can vary as needed or desired. Also, the number and placement of various components of the automatic face and human subject enhancement process 1000 can vary as needed or desired. In addition, the automatic face and human subject enhancement process 1000 may be used in any other suitable imaging process and is not limited to the specific processes described above.

Figure 11A:
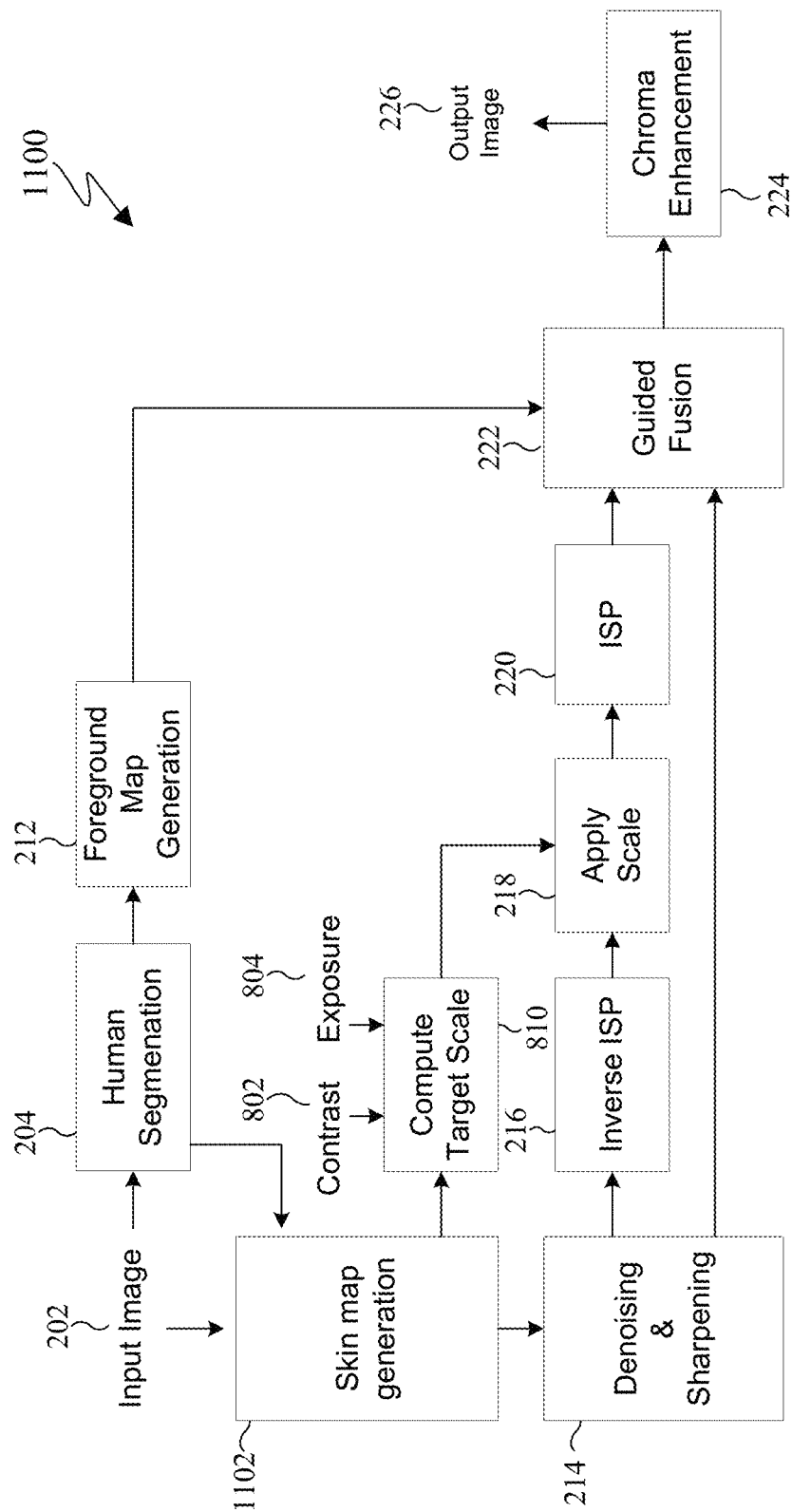
FIGS. 11A and 11B illustrate an automatic face and human subject enhancement algorithm in accordance with this disclosure.
Figure 11B:
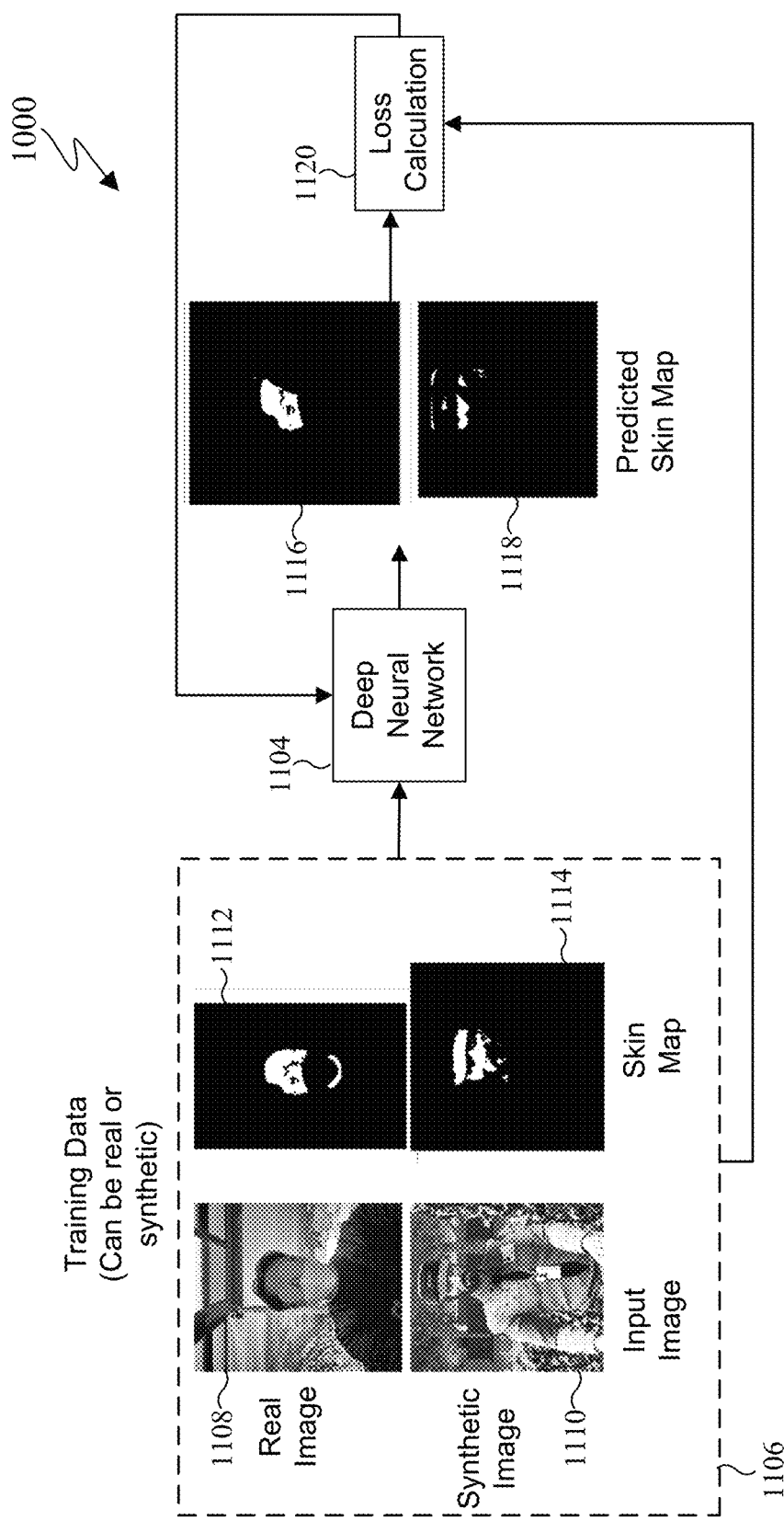

FIGS. 11A and 11B illustrate an automatic face and human subject enhancement process 1100 in accordance with this disclosure. In particular, FIG. 11A illustrates an automatic face and human subject enhancement process 1100, and FIG. 11B illustrates a skin map generation 1102. The embodiments of the automatic face and human subject enhancement process 1100, and the skin map generation 1102 illustrated in FIGS. 11A and 11B are for illustration only. FIGS. 11A and 11B do not limit the scope of this disclosure to any particular implementation of an automatic face and human subject enhancement algorithm. The elements 202, 204 and 212-226 are the same for human subject enhancement process 1100 as elements 202, 204 and 212-226 described with process 200 shown in FIG. 2 and elements 802, 804 and 810 are the same for human subject enhancement process 1100 as elements 802, 804 and 810 described with process 800 shown in FIG. 8. The description of elements 202, 204, 212-226, 802, 804, and 810 will be omitted for simplicity.

As shown in FIGS. 11A and 11B, face detection 206 and skin map generation 208 have been replaced with skin map generation 1102. Skin map generation 1102 can be trained using a deep neural network 1104 for generating a skin map. The deep neural network 1104 can be trained to identify skin in an image. After the training, the deep learning neural network 1104 can provide a model to predict skin learnt from real examples.

Training data for the deep neural network 1104 can include real images 1108, synthetic images 1110, real skin map 1112 from the real images 1108, and synthetic skin maps 1114 generated from the synthetic images 1110. One possibility is that the skin maps can be generated using the skin map generation 208 shown in FIGS. 5A and 5B.

The deep neural network 1104 can generate a predicted real skin map 1116 based on the real image 1108 and the real skin map 1112. The deep neural network can generate a predicted synthetic skin map 1118 based on the synthetic image 1110 and the synthetic skin map 1114.

A loss calculation 1120 can be utilized to minimize a loss between the real skin map 1112 and the predicted real skin map 1116 and to minimize a loss between the synthetic skin map 1114 and the predicted synthetic skin map 1118. The loss calculation 1120 can provide information to the deep neural network 1104 to adjust the predicted skin map generation based on the calculated loss. The deep neural network 1104 is considered as trained once the loss calculation 1120 is below a specified threshold.

Although FIGS. 11A and 11B illustrate an automatic face and human subject enhancement process 1100, various changes may be made to FIGS. 11A and 11B. For example, the sizes, shapes, and dimensions of the automatic face and human subject enhancement process 1100, and the skin map generation 1102 and their individual components can vary as needed or desired. Also, the number and placement of various components of the automatic face and human subject enhancement process 1100, and the skin map generation 1102 can vary as needed or desired. In addition, the automatic face and human subject enhancement process 1100, and the skin map generation 1102 may be used in any other suitable imaging process and is not limited to the specific processes described above.

Figure 12C:
FIGS. 12A through 12C illustrate examples of different image processing in accordance with this disclosure.
Figure 12B:
Figure 12A:
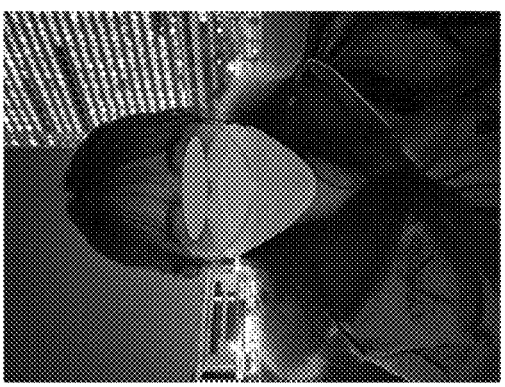

FIGS. 12A through 12C illustrate examples of different image processing in accordance with this disclosure. In particular, FIG. 12A illustrates a basic processed image 1200, FIG. 12B illustrates a global brightening image 1202, and FIG. 12C illustrates a face brightness processed image 1204. The embodiments of the basic processed image 1200, the global brightening image 1202, and the face brightness processed image 1204 illustrated in FIGS. 12A through 12C are for illustration only. FIGS. 12A through 12C do not limit the scope of this disclosure to any particular implementation of a/an examples of different image processing.

As shown in FIG. 12A, the face is difficult to see in the basic processed image 1200. The light coming from the background can affect the light capture in the foreground including the facial area. The face does not have as much clear detail due to this darkness.

As shown in FIG. 12B, the face in the global brightened image 1202 has been brightened along with the background using a global toning map function. The face appears to have a lower contrast than the basic processed image 1200. The background has been similarly brightened and the contrast has been negatively impacted by the global brightening.

As shown in FIG. 12C, the face in the face brightened image 1204 has been brightened separately from the non-face portions of the image. The contrast in the face preserves detail while brightening while not negatively affecting the background.

Although FIGS. 12A through 12C illustrate a examples of different image processing, various changes may be made to FIGS. 12A through 12C. For example, the sizes, shapes, and dimensions of the basic processed image 1200, the global brightening image 1202, and the face brightness processed image 1204 and their individual components can vary as needed or desired. Also, the number and placement of various components of the basic processed image 1200, the global brightening image 1202, and the face brightness processed image 1204 can vary as needed or desired. In addition, the basic processed image 1200, the global brightening image 1202, and the face brightness processed image 1204 may be used in any other suitable imaging process and is not limited to the specific processes described above.

Figure 13:
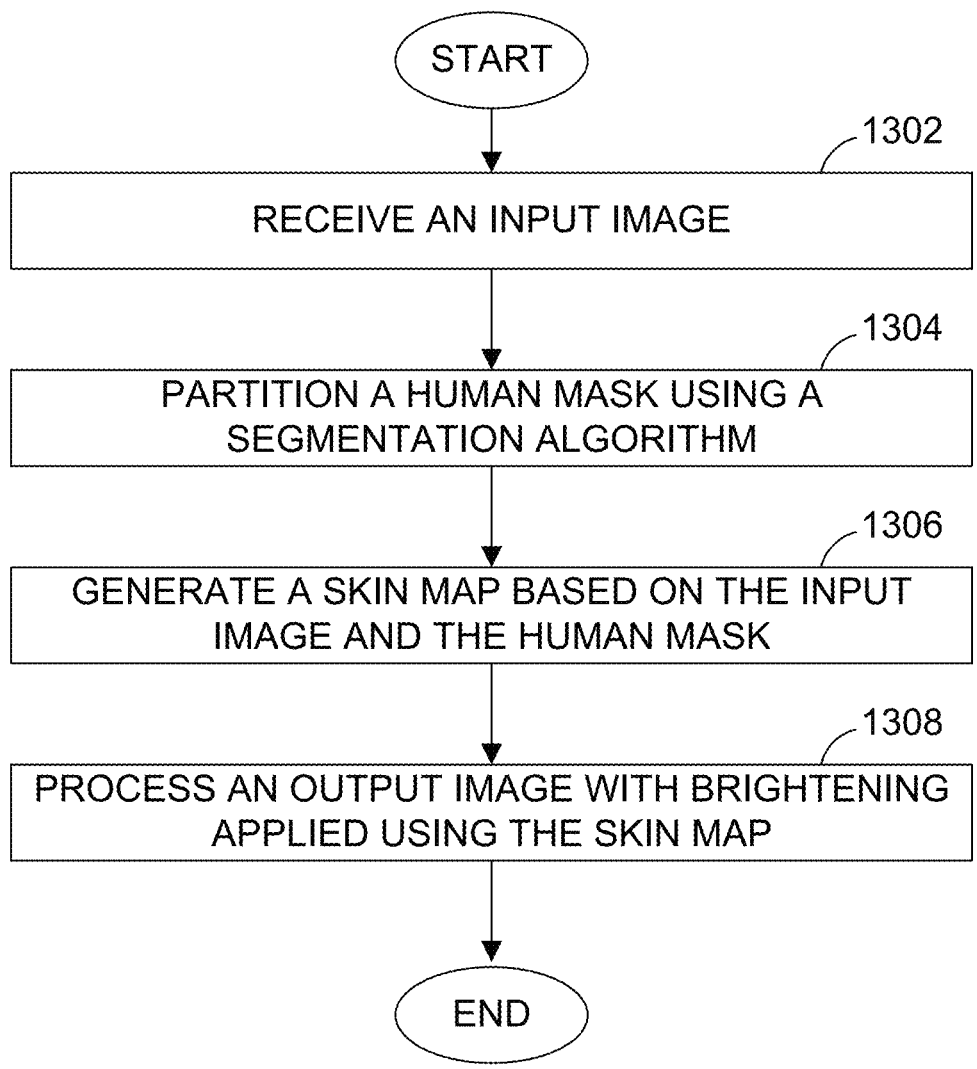
FIG. 13 illustrates an example method for an automatic face and human subject enhancement algorithm for digital images according to this disclosure.

FIG. 13 illustrates an example method 1300 for an automatic face and human subject enhancement algorithm for digital images according to this disclosure. For ease of explanation, the method 1300 of FIG. 13 is described as being performed using the electronic device 101 of FIG. 1. However, the method 1300 may be used with any other suitable system and any other suitable electronic device.

As shown in FIG. 13, the electronic device receives an input image 202 at step 1302. The input image 202 can be an RGB image, a Bayer image, or any other suitably formatted image. Receiving the input image 202 can includes capturing the input image 202 using a sensor 180 of the electronic device 101, reading the input image from a memory 130 of the electronic device, receiving the input image 202 through a communication interface 170 of the electronic device 101 from a first external device 102 over a second network 164, receiving the input image 202 through the communication interface 170 of the electronic device 101 from a second external device 106 or a server 104 over a first network 162, received from an external storage through the I/O interface 150 of the electronic device 101, or received in any other suitable manner. The input image 202 can be a fully software ISP processed image.

The electronic device 101 partitions a human mask in the input image using a segmentation algorithm at step 1304. The segmentation algorithm is used to distinguish humans in the input image 202. The distinguished humans are partitioned in a human mask. The human mask can be generated in grayscale and have a binarize algorithm applied. The binarize algorithm sets a threshold for a value of pixels that could part of a human from other pixels.

The electronic device 101 generates a skin map based on identifying skin in the input image using the human mask at step 1306. The skin map generation can convert an RGB image to an HSV image and a YUV image. An HSV image map is generated based on a range for each of an H value, an S value, and a V value. An YUV image map is generated based on a range for each of a Y value, a U value, and a V value. The maps are then multiplied to produce the skin map.

In certain embodiments, a face can be detected from the input image using the human mask. The face detection is used to restrict a skin segmentation algorithm to the facial region. This operation can significantly reduce computation resources of the electronic device 101.

In certain embodiments, the skin map can be generated using an AI skin map trained model using a deep neural network to identify skin in an image. The AI skin map model can be trained using real images or synthetic images. When using real images, a real skin map can be provided for training the AI skin map model. When using synthetic images, a synthetic skin map can be provided for training the AI skin map model. The deep neural network can generate an estimated skin map from the training data. A loss function is used to determine a loss between the estimated skin map and the skin map(s) from the training data. The loss is provided to the neural network for adjusting the processing of the estimated skin maps. Once the loss is below an acceptable threshold, the AI skin map models is considered to be trained and can be used in the skin brightening pipeline.

The electronic device 101 processes at output image with brightening applied using the skin map at step 1308. The processing of the output image can include an additional number of steps including foreground map generation, computing a target scale, denoising and sharping the input image 202 before brightening, perform inverse ISP on the input image, apply the target scale to the inverted ISP image, perform ISP on the scaled image, fusing the scaled image and the input image, provide chroma enhancement to the fused image.

For the foreground map generation, a foreground map is generated from the input image 202 and the human mask. The foreground map generation can also have a gain map applied to reduce focus on the boundaries of the image.

The target scale computation, provides a target scale for brightening the skin on the face of the human in the input image 202. The target scale can be limited to a maximum facial brightness based on an exposure exceeding a suitable threshold. The target scale can be limited to a maximum facial brightness based on a contrast exceeding a suitable threshold. In certain embodiments, the target scale can be limited to a maximum facial brightness based on both an exposure exceeding a threshold and a contrast exceeding a threshold. The threshold for both the exposure and the contrast can be based on a level determined to be pleasing to view a face.

Denoising and sharping the input image 202 can be performed using a conventional denoising algorithm. The denoising and sharpening can limit noise on the facial area that may result due to scaling or brightening. The denoising and sharpening can also enhance features of the face with a sharper look.

The inverse ISP is performed on the input image to linearize the image from a gamma corrected space. The linearization is required to appropriately apply the target scale to the input image. The inverse ISP image is brightening based on the target scale. Once the inverse ISP image is brightened, gamma correction is applied again to the linear image to return to a "human perceptual" space.

The scaled (brightened) image and the input image are fused together using the foreground map. The foreground map allows the pixels in the facial and human regions to be more heavily weighed from the brightened image, while the background and other regions are more heavily weighed from the non-brightened image.

Chroma enhancement can be applied to the fused image to correct colors that were adjusted in the scale application for the brightened image. The output image is then fully processed and can be output to a display 160 of the electronic device, stored to a memory 130 of the electronic device 101, transmitted using the communication interface 170 of the electronic device 101 to a first external device 102 over a second network 164 or to a second external device 104 and a server 106 over a first external network 162.

Although FIG. 13 illustrates one example of a method 1300 for an automatic face and human subject enhancement algorithm in digital images, various changes may be made to FIG. 13. For example, while shown as a series of steps, various steps in FIG. 13 may overlap, occur in parallel, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. An apparatus comprising:
   at least one memory configured to store images; and
   at least one processor configured to:
     receive an input image;
     partition a human mask in the input image using a segmentation algorithm;
     generate a skin map based on identifying skin in the input image using the human mask;
     determine a target scale for brightening based on the skin map, wherein the target scale is limited to a maximum facial brightness based on a contrast exceeding a contrast threshold; and
     process an output image with brightening applied using the target scale with the skin map.

2. The apparatus of claim 1, wherein the skin map is generated using an AI skin map model trained using a deep neural network to identify skin.

3. The apparatus of claim 2, wherein the AI skin map model is trained using real image or synthetic images.

4. The apparatus of claim 1, wherein, to generate the skin map, the at least one processor is configured to:
   detect a face from the input image using the human mask in conjunction with the input image; and
   generate the skin map based on identifying skin in the input image using the detected face.

5. The apparatus of claim 1, wherein the maximum facial brightness is also based on an exposure exceeding an exposure threshold.

6. An apparatus comprising:
   at least one memory configured to store images; and
   at least one processor configured to:
     receive an input image;
     partition a human mask in the input image using a segmentation algorithm;
     generate a skin map based on identifying skin in the input image using the human mask; and
     process an output image with brightening applied using the skin map;
   wherein, to process the output image with brightening applied using the skin map, the at least one processor is configured to:
     generate a foreground map based on the human mask;
     process a skin brightened image based on brightening the input image using the skin map; and
     fuse the output image from the input image and the skin brightened image based on the foreground map.

7. The apparatus of claim 6, wherein, to process the output image with brightening applied using the skin map, the at least one processor is configured to:
   determine a target scale for brightening based on the skin map, wherein the target scale is limited to a maximum facial brightness based on a contrast exceeding a contrast threshold; and
   process the output image with brightening applied using the target scale with the skin map.

8. A method comprising:
   receiving an input image;

partitioning a human mask in the input image using a segmentation algorithm;
generating a skin map based on identifying skin in the input image using the human mask; and
processing an output image with brightening applied using the skin map;
wherein processing the output image with brightening applied using the skin map comprises:
generating a foreground map based on the human mask;
processing a skin brightened image based on brightening the input image using the skin map; and
fusing the output image from the input image and the skin brightened image based on the foreground map.

9. The method of claim 8, wherein the skin map is generated using an AI skin map model trained using a deep neural network to identify skin.

10. The method of claim 9, wherein the AI skin map model is trained using real image or synthetic images.

11. The method of claim 8, wherein generating the skin map comprises:
detecting a face from the input image using the human mask in conjunction with the input image; and
generating the skin map based on identifying skin in the input image using the detected face.

12. The method of claim 8, wherein processing the output image with brightening applied using the skin map comprises:
determining a target scale for brightening based on the skin map, wherein the target scale is limited to a maximum facial brightness based on an exposure exceeding an exposure threshold; and
processing the output image with brightening applied using the target scale with the skin map.

13. The method of claim 8, wherein processing the output image with brightening applied using the skin map comprises:
determining a target scale for brightening based on the skin map, wherein the target scale is limited to a maximum facial brightness based on a contrast exceeding a contrast threshold; and
processing the output image with brightening applied using the target scale with the skin map.

14. A non-transitory computer readable medium containing instructions that when executed cause at least one processor to:
receive an input image;
partition a human mask in the input image using a segmentation algorithm;
generate a skin map based on identifying skin in the input image using the human mask;
determine a target scale for brightening based on the skin map, wherein the target scale is limited to a maximum facial brightness based on a contrast exceeding a contrast threshold; and
process an output image with brightening applied using the target scale with the skin map.

15. The non-transitory computer readable medium of claim 14, wherein the skin map is generated using an AI skin map model trained using a deep neural network to identify skin.

16. The non-transitory computer readable medium of claim 14, wherein the instructions that when executed cause the at least one processor to generate the skin map comprise instructions that when executed cause the at least one processor to:
detect a face from the input image using the human mask in conjunction with the input image; and
generate the skin map based on identifying skin in the input image using the detected face.

17. The non-transitory computer readable medium of claim 14, wherein the maximum facial brightness is also based on an exposure exceeding an exposure threshold.

18. The non-transitory computer readable medium of claim 14, wherein the instructions that when executed cause the at least one processor to process the output image with brightening applied using the skin map comprise instructions that when executed cause the at least one processor to:
generate a foreground map based on the human mask;
process a skin brightened image based on brightening the input image using the skin map; and
fuse the output image from the input image and the skin brightened image based on the foreground map.

19. The apparatus of claim 1, wherein, to generate the skin map, the at least one processor is configured to:
generate a hues, saturation, and luminance (HSV) map formed of pixels with a hue (H) value between a minimum H value and a maximum H value, a saturation(S) value between a minimum S value and a maximum S value, and a luminance (V) value between a minimum V value and a maximum V value;
generate a color space (YUV) map formed of pixels with a Y value between a minimum Y value and a maximum Y value, a U value between a minimum U value and a maximum U value, and the V value between the minimum V value and the maximum V value; and
generate the human mask by multiplying the HSV map and the YUV map.

20. The non-transitory computer readable medium of claim 14, wherein the instructions that when executed cause the at least one processor to generate the skin map comprise instructions that when executed cause the at least one processor to:
generate a hues, saturation, and luminance (HSV) map formed of pixels with a hue (H) value between a minimum H value and a maximum H value, a saturation(S) value between a minimum S value and a maximum S value, and a luminance (V) value between a minimum V value and a maximum V value;
generate a color space (YUV) map formed of pixels with a Y value between a minimum Y value and a maximum Y value, a U value between a minimum U value and a maximum U value, and the V value between the minimum V value and the maximum V value; and
generate the human mask by multiplying the HSV map and the YUV map.

* * * * *